(12) United States Patent
Kozono et al.

(10) Patent No.: US 6,183,577 B1
(45) Date of Patent: Feb. 6, 2001

(54) METHOD AND APPARATUS FOR MANUFACTURING AN OPTICAL INFORMATION MEDIUM

(75) Inventors: Toshikazu Kozono, Neyagawa; Toshio Yanai, Osaka; Manabu Nakanishi, Katano; Kiyoshi Inoue, Osaka, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/195,102

(22) Filed: Nov. 18, 1998

(30) Foreign Application Priority Data

Nov. 19, 1997 (JP) .................................................... 9-317934

(51) Int. Cl.[7] .......................... B32B 31/06; B32B 31/16; B32B 31/28
(52) U.S. Cl. ........................ 156/74; 156/160; 156/275.7; 156/285; 156/295
(58) Field of Search .................................. 156/74, 275.5, 156/275.7, 285, 160, 295

(56) References Cited

U.S. PATENT DOCUMENTS 5,800,670 * 9/1998 Kitano ..................................... 156/74

FOREIGN PATENT DOCUMENTS 8-161771   6/1996  (JP) .
97/36737 * 10/1997  (WO) .

* cited by examiner

*Primary Examiner*—Michael W. Ball
*Assistant Examiner*—Michael A Tolin
(74) *Attorney, Agent, or Firm*—Smith, Grambrell & Russell, LLP

(57) ABSTRACT

A method for manufacturing an optical information medium has a step of bending at least one of a first board and a second board having a center hole, a step of applying a radiation-curing resin onto the bent board in a doughnut form while the bent board is rotated, and a step of lapping the other board on the bent board and rotating the paired boards integrally.

6 Claims, 4 Drawing Sheets

Fig. 4 (PRIOR ART) (A)
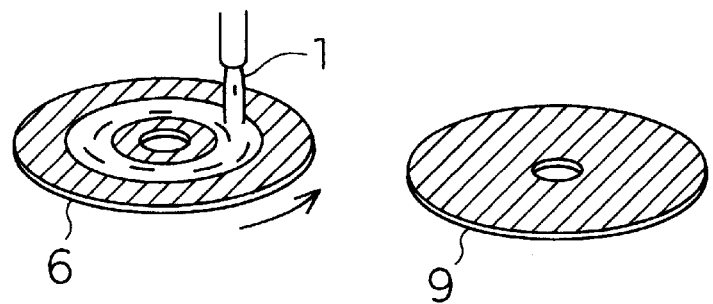
Fig. 4 (PRIOR ART) (B)
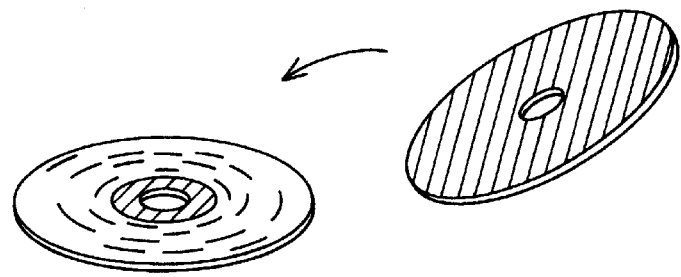
Fig. 4 (PRIOR ART) (C)
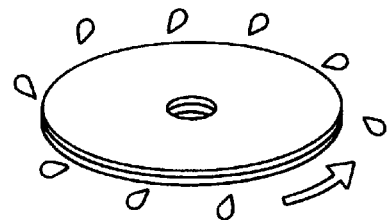
Fig. 4 (PRIOR ART) (D)
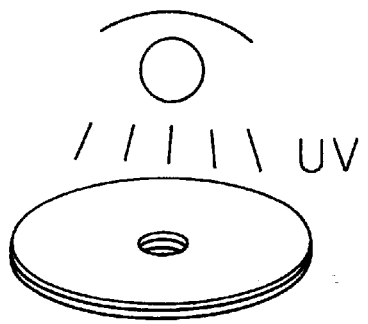

METHOD AND APPARATUS FOR
MANUFACTURING AN OPTICAL
INFORMATION MEDIUM

BACKGROUND OF THE INVENTION

1. Field of the Invention

The present invention relates to a manufacturing method and a manufacturing apparatus in which two optical information boards are bonded together.

2. Description of the Related Art

In order to achieve high density of an optical disk, it is necessary to shorten the wavelength of a regenerative laser and to increase the numerical aperture (NA) of an objective lens. For the high-NA objective lens, however, the allowable disk tilt is very small. However, by decreasing the thickness of a board, the allowable range for the disk tilt is widened, so that the high density of a practical optical disk using a high-NA objective lens can be achieved.

For the optical disk using a thin board, two boards are bonded because one board hangs down by gravity. The bonding of two boards not only increases the mechanical strength but also doubles the capacity because both surfaces are used. A conventional method for manufacturing a disk will be explained with reference to FIG. 4 (Japanese Patent Application Laid-Open No. 8-161771). A board 6 provided with a first information signal surface on its one surface is manufactured by the injection molding method or the like method by using a transparent resin whose principal ingredient is polycarbonate. A reflective film is formed on the information signal surface by the sputtering method or the vacuum deposition method. Also, a board 9 provided with a second information signal surface on its one surface is manufactured by the injection molding method or the like method, and a reflective film is formed on the information signal surface by the sputtering method or the vacuum deposition method. For these reflective films, a metal whose principal ingredient is aluminum is used. While the board 1 is rotated at a low speed, a radiation-curing resin 1 is applied in a doughnut form (FIG. 4(A)). The second board 2 is lapped on the board 1 in such a manner that the reflective film on the information signal surface faces the radiation-curing resin 1 (FIG. 4(B)). By rotating the board 6 and the board 9 integrally at a high speed, the radiation-curing resin is spread uniformly between the board 6 and the board 9 (FIG. 4(C)). After the radiation-curing resin has been spread uniformly, radioacive rays (in FIG. 4, ultraviolet rays are used) are irradiated through the board 9 and the reflective film to cure the radiation-curing resin, whereby two boards are bonded together (FIG. 4(D)).

However, when the radiation-curing resin is applied in a doughnut form while the board is rotated, the other board to be bonded is lapped on the board, and the radiation-curing resin is spread between the two boards by rotating the boards integrally at a high speed, the radiation-curing resin at the inner peripheral portion is moved toward the outer periphery in large quantities by the centrifugal force, so that a variation in thickness of the radiation-curing resin occurs within the board.

This problem is generally solved by contriving the conditions such as the revolutions per minute, rotation time, and viscosity, application amount and application position of radiation-curing resin. Nevertheless, in the method using a rotating force, a disk is produced which has a tendency such that the radiation-curing resin is thinner at the inner peripheral portion than at the middle portion. Although this does not present a very serious problem when the radiation-curing resin has only a bonding function for bonding the two boards, for a disk requiring a function of an intermediate layer for regulating the distance between the two boards, it is difficult to stably form a highly accurate intermediate layer in the whole region of the disk because the accuracy required for the intermediate layer is on the order of micron.

SUMMARY OF THE INVENTION

The present invention has been made to solve the above problems, and accordingly an object thereof is to provide a method and an apparatus for manufacturing an optical information medium of bonded disk in which a variation in thickness of a radiation-curing resin caused by the centrifugal force is reduced, and the thickness accuracy of an intermediate layer is high.

To achieve the above object, the present invention provides a method for manufacturing an optical information medium comprising a step of bending at least one of a first board and a second board having a center hole, a step of applying a radiation-curing resin onto the bent board in a doughnut form while the bent board is rotated, and a step of lapping the other board on the bent board and rotating the paired boards integrally.

Also, the present invention provides an apparatus for manufacturing an optical information medium comprising conveying means for conveying a first board and a second board having a center hole, means for bending the first or second board, applying means for applying an ultraviolet-curing resin onto the bent board in a doughnut form while the bent board is rotated, lapping means for putting the remaining board on the bent board, high-speed rotating means for rotating the first and second boards integrally, and radiation irradiating means for irradiating a radiation to the radiation-curing resin by penetrating at least one of the first and second boards.

Thereupon, the present invention can provide a method and an apparatus for manufacturing a bonded disk having a small variation in thickness of the ultraviolet-curing resin and excellent appearance.

According to the present invention, by providing the accumulating place of ultraviolet-curing resin between the two boards, the movement of a large amount of ultraviolet-curing resin to the outer peripheral portion caused by the high-speed rotation can be prevented. Therefore, a uniform ultraviolet-curing resin layer having a small variation in thickness in the whole region of the board can be formed.

BRIEF DESCRIPTION OF THE DRAWINGS

FIGS. 4(A)–(D) are a view for illustrating a conventional manufacturing process for an optical information medium.

DETAILED DESCRIPTION OF THE PREFERRED EMBODIMENTS

Figure 1:
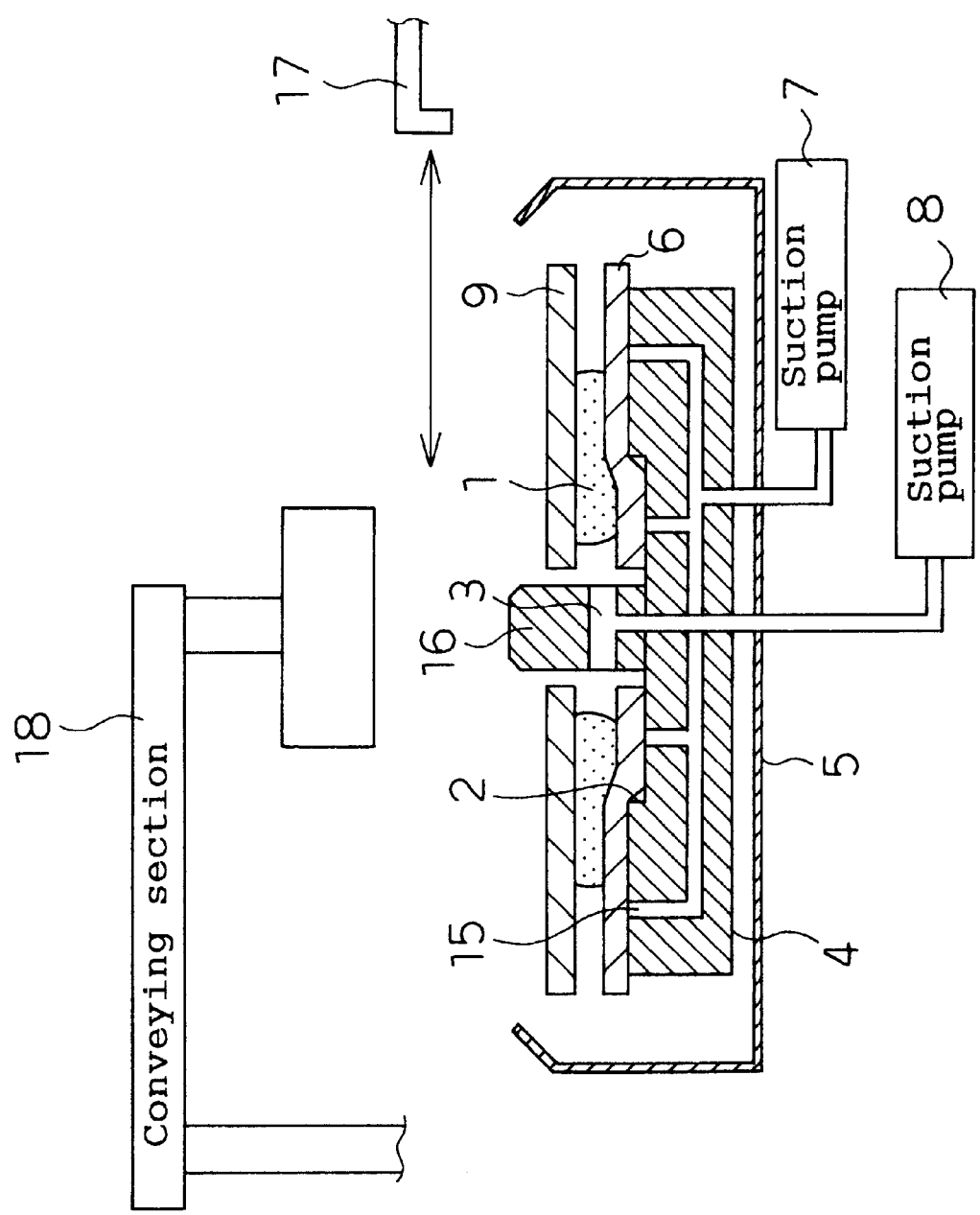
FIG. 1 is a schematic view showing an embodiment of a method for manufacturing an optical information medium in accordance with the present invention.
Figure 2:
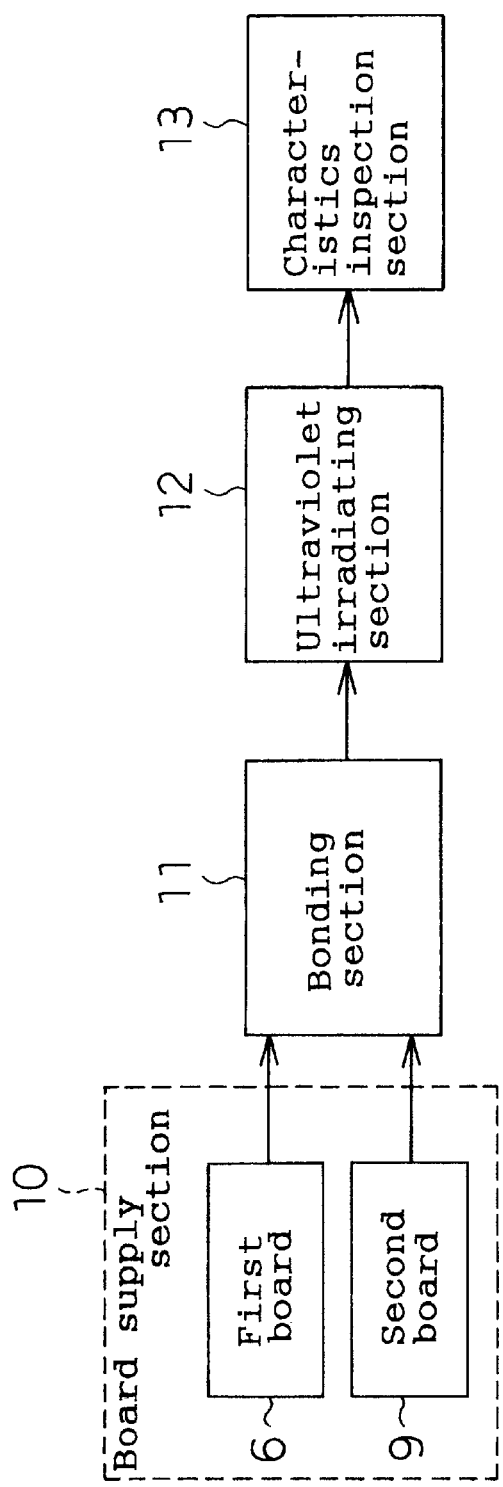
FIG. 2 is a block diagram for an apparatus for manufacturing an optical information medium in accordance with the present invention.
Figure 3:
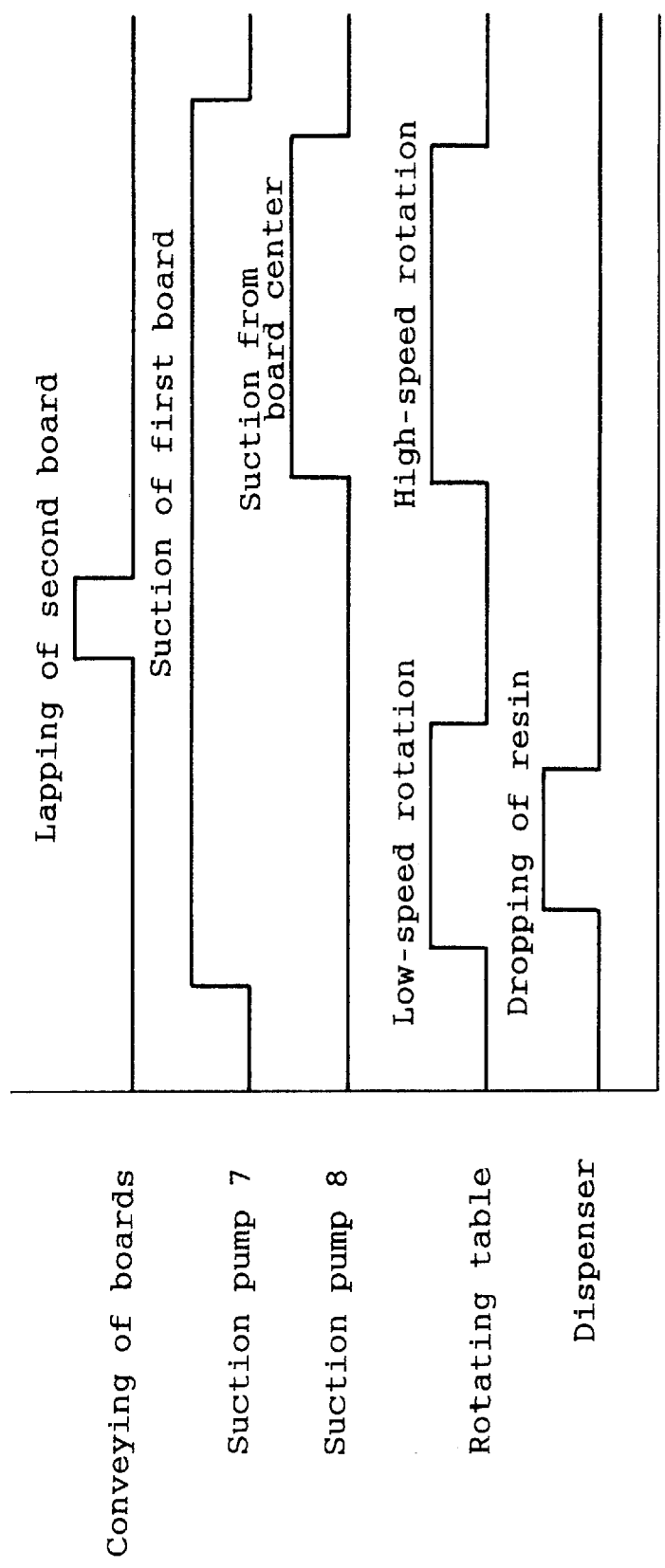
FIG. 3 is a timing chart for an apparatus for manufacturing an optical information medium in accordance with the present invention.

One embodiment of the present invention will be described in detail with reference to FIGS. 1 to 3. FIG. 1 is a schematic view of a principal portion of an apparatus for manufacturing an optical information medium, FIG. 2 is a block diagram for the apparatus for manufacturing an optical information medium, and FIG. 3 is a timing chart for the principal portion of the apparatus for manufacturing an optical information medium. As an example of radiation-curing resin, an ultraviolet-curing resin 1 is used, and as an example of radioactive rays, ultraviolet rays are used. First, a first board 6, in which a reflective film is formed on a transparent board made of elastic polycarbonate or the like material, is conveyed from a board supply section 10 to a bonding section 11 by using conveying means 18. The first board 6 conveyed to the bonding section 11 is put on a rotating table 4 and fixed to the rotating table 4 by vacuum suction using a suction pump 7. At this time, on the surface of the rotating table 4, a step portion 2 with a diameter of 40 to 80 mm and a depth of 0.01 to 5.00 mm and suction holes 15 are provided, so that the first board is bent along the step portion 2. Also, if the step is large, the bent portion of the first board is easily damaged, so that the depth should preferably be within 1.0 mm. The bending state of the board is exaggeratedly drawn in the figure for clarity.

Also, the diameter of a circular portion where the step portion 2 is formed is determined so as to be the optimum size based on the application amount and application position.

It is preferable that the rotating table 4 have an outside diameter slightly smaller than the diameters of the first and second boards 6 and 9. This is because a phenomenon is prevented that the interior of the table cover 5 is filled with the ultraviolet-curing resin 1 scattering from the two rotating boards, part of the resin 1 adheres to the outer edge of the rotating table 4, the adhesion amount increases gradually as the number of bonded boards increases, and finally the resin 1 spreads onto the rotating table 4.

While the rotating table 4 is rotated at a low speed (30 to 120 rpm), the ultraviolet-curing resin 1 is dropped from the application nozzle 17 onto the first board 6 and applied in a doughnut form. It is preferable that the dropping position be on the step portion 2. This is because the resin 1 is prone to flow uniformly to the inner peripheral side and to the outer peripheral side with the step portion 2 being the boundary. After the application is finished, the rotation of the rotating table 4 is stopped, and the second board 9, in which a reflective film is formed on a transparent board made of polycarbonate, is conveyed from the board supply section 10 to the bonding section 11 by using conveying means 8, and lapped on the first board 6.

As a result, the ultraviolet-curing resin 1 spreads concentrically toward the inner periphery between the paired boards gradually, and reaches a position within 12 to 20 mm from the board center. At this time, the rotating table 4 is rotated at a high speed (1000 to 3000 rpm). The ultraviolet-curing resin 1 is spread toward the outer periphery by the centrifugal force of the high-speed rotation. However, because the first board 6 is bent, a larger amount of the ultraviolet-curing resin 1 accumulates at the inner peripheral portion of the paired boards. Further, at the time of the high-speed rotation, the ultraviolet-curing resin 1 is sucked from the board center by using a suction pump 8 through a suction hole 3 formed in a center boss 16, by which a force directed to the center is given to the resin 1. Therefore, even if the resin 1 is moved toward the outer periphery by the high-speed rotation, consequently the resin 1 moves only slightly without being moved in large quantities. As a result, the resin 1 lies uniformly at the inner peripheral portion, middle peripheral portion, and outer peripheral portion. That is to say, the resin 1 has a uniform thickness.

As is apparent from the above description, the reason why the rotating table 4 is not rotated at a high speed until the resin 1 reaches a position within 12 to 20 mm from the board center is that if the distance from the board center to the ultraviolet-curing resin 1 is farther than that value, the accumulation of resin at the step portion and the effect of centripetal force caused by the suction are reduced, so that the thickness of the ultraviolet-curing resin 1 at the inner peripheral portion is decreased.

Next, the bonded boards are conveyed from the bonding section 11 to an ultraviolet irradiating section 12 to cure the ultraviolet-curing resin 1. Thereafter, the bonded boards are conveyed to a characteristics inspection section 13 to judge the quality, whereby the bonded disk is completed.

EXAMPLES

The thickness distribution of the ultraviolet-curing resin 1 between the boards bonded based on this embodiment was checked experimentally, and the results are given in Table 1. Also, Table 2 gives the thickness distribution of the ultraviolet-curing resin 1 between the boards bonded by the conventional method, comparing with the method of the present invention. The thickness was measured by using a measuring instrument (LT-800) manufactured by Keyens Corp. Also, the revolutions per minute at low speed was 60 rpm, the revolutions per minute at high speed was 2200 rpm, the diameter of board was 12 cm, the high-speed rotation time was 5 seconds, the size of the step was 0.1 mm, and the diameter of the circle of the step portion was 50 mm. As the ultraviolet-curing resin, the resin having the trade name of "KAYARAD" manufactured by Nippon Kayaku Co., Ltd. was used. The dropping amount of the resin was 3 g, and the viscosity thereof was 500 cps/25° C.

As shown in this experiment, in the conventional method, the thickness of the resin at a side of the inner peripheral portion of the board is thin, and the dispersion of the thickness of the resin on a circle having the smaller radius at the side of the inner peripheral portion of the board is large. Even if the viscosity and dropping amount of the ultraviolet-curing resin 1, the revolutions per minute, and rotation time are changed, this tendency does not change so much. However, as shown in the present invention, since the accumulating place of the ultraviolet-curing resin 1 is provided at a side of the inner peripheral portion, and the centripetal force is given, the dispersion of the thickness of the resin 1 on a circle having the radius of 20 mm for example, is 4 μm as shown in Table 1 while the dispersion of the thickness of resin on a circle having the radius 20 mm in the conventional is 12 μm as shown in Table 2. As the result the dispersion of the 20 mm radius circle is decreased from the conventional 12 μm to 4 μm.

Although the rotating table 4 was made of a metallic material such as stainless steel or aluminum, or a ceramic material, and the surface thereof was machined to provide the step portion, the same effect can be achieved by a resin sheet affixed to the surface.

TABLE 1

| | Thickness Unit: μm | | | | |
|---|---|---|---|---|---|
| Position on board (radius: mm) | 20 | 30 | 40 | 50 | 58 |
| Max. thickness | 48 | 53 | 54 | 56 | 54 |
| Min. thickness | 44 | 47 | 49 | 53 | 50 |
| On-circle dispersion | 4 | 6 | 5 | 3 | 4 |
| Within-board plane dispersion | | | 12 | | |

TABLE 2

| | Thickness Unit: μm | | | | |
|---|---|---|---|---|---|
| Position on board (radius: mm) | 20 | 30 | 40 | 50 | 58 |
| Max. thickness | 49 | 53 | 56 | 59 | 53 |
| Min. thickness | 37 | 44 | 51 | 53 | 45 |
| On-circle Dispesion | 12 | 9 | 5 | 6 | 8 |
| Within-board plane dispersion | | | 22 | | |

Thus, in this embodiment, the accumulating place of the ultraviolet-curing resin 1 is provided at a side of the inner peripheral portion between the paired boards, and the centripetal force is given by sucking the ultraviolet-curing resin 1 from the board center by using the suction pump 8 at the time of high-speed rotation. Thereby, the dispersion in thickness of the ultraviolet-curing resin 1 can be reduced, and a bonded disk having a stable thickness can be manufactured easily.

The shape of the step portion of the present invention is not limited to the right-angled shape as shown in FIG. 1, and it may be a shape of inclined line or a shape of gentle curve.

What is claimed is:

1. A method for manufacturing an optical information medium comprising the steps of:

bending a first board having a center hole;

applying a radiation-curing resin onto the bent first board in a doughnut form while the bent first board is rotated; and after applying the radiation-curing resin, placing a second board having a center hole on the bent first board so as to integrally pair the first and second boards and rotating the paired first and second boards integrally, wherein in the step of placing the second board on the bent first board and rotating, the bent first board is maintained in a bent condition.

2. A method for manufacturing an optical information medium according to claim 1, wherein in the step of bending the first board, the first board is bent by placing it on a rotating table having an outside diameter smaller than the outside diameters of the first and second boards and having a step portion or an inclined portion.

3. A method for manufacturing an optical information medium according to claim 1, wherein the bent first board has an inner peripheral side lower than the outer peripheral side thereof on a rotating table for rotating the first board.

4. A method for manufacturing an optical information medium according to claim 1, wherein in the step of rotating the paired first and second boards integrally, the first and second boards are rotated at a speed in the range of 1000 to 3000 rpm after the radiation-curing resin flows and reaches a position within 12 to 20 mm from the center of the paired first and second boards.

5. A method for manufacturing an optical information medium according to claim 1, wherein the step of rotating the paired first and second boards integrally includes a step of sucking the radiation-curing resin from the center hole of the paired first and second boards while the paired first and second boards are rotated.

6. A method for manufacturing an optical information medium according to claim 2, wherein the bent first board has the inner peripheral side lower than the outer peripheral side thereof on a rotating table for rotating the first board.

* * * * *